United States Patent [19]

Yamanaka et al.

[11] Patent Number: 4,517,091

[45] Date of Patent: May 14, 1985

[54] SOLIDS-LIQUID SEPARATOR

[75] Inventors: Koichi Yamanaka, Tokyo; Tetsuro Gotoh; Masanori Aoki, both of Kanagawa; Isao Kataoka, Chiba; Shunro Nishiwaki, Kanagawa, all of Japan

[73] Assignee: Ebara Corporation, Tokyo, Japan

[21] Appl. No.: 538,992

[22] Filed: Oct. 4, 1983

[30] Foreign Application Priority Data

| Nov. 2, 1982 [JP] | Japan | 57-191887 |
| Dec. 15, 1982 [JP] | Japan | 57-218397 |
| Dec. 22, 1982 [JP] | Japan | 57-223858 |
| Mar. 28, 1983 [JP] | Japan | 58-50367 |

[51] Int. Cl.$^3$ ............................................. B01D 21/26
[52] U.S. Cl. .............................. 210/512.1; 210/532.1; 210/540; 210/788; 209/211
[58] Field of Search ............... 210/104, 109, 112, 114, 210/115, 512.1, 512.3, 540, 532.1, 519, 520, 787, 788; 209/211

[56] References Cited

U.S. PATENT DOCUMENTS

| 1,534,145 | 4/1925 | Stedman | 210/512.1 |
| 1,651,246 | 11/1927 | Bell | 210/512.1 |
| 2,010,435 | 8/1935 | Matheson | 210/512.1 |
| 2,068,140 | 1/1937 | Jaquith | 210/512.1 |
| 2,088,294 | 7/1937 | Geiger | 210/512.1 |
| 2,235,998 | 3/1941 | Kleinschmidt | 210/512.1 |
| 2,425,932 | 8/1947 | Green | 210/512.1 |
| 2,644,584 | 7/1953 | Johnson | 210/540 |
| 2,670,848 | 3/1954 | Houten | 210/540 |
| 2,826,306 | 3/1958 | Burns | 210/115 |
| 2,994,432 | 8/1961 | Schlutter | 210/109 |
| 3,962,084 | 6/1976 | Nussbaum | 210/512.1 |
| 3,971,719 | 7/1976 | Peters | 210/540 |
| 4,049,549 | 9/1977 | Moore | 210/112 |
| 4,054,520 | 10/1977 | McGivern | 210/540 |
| 4,111,809 | 9/1978 | Pichon | 210/512.1 |
| 4,257,900 | 3/1981 | White | 210/112 |
| 4,278,541 | 7/1981 | Eis | 210/112 |
| 4,343,707 | 8/1982 | Lucas | 210/512.1 |

FOREIGN PATENT DOCUMENTS

| 830531 | 3/1960 | United Kingdom | 210/512.3 |
| 2082941 | 3/1982 | United Kingdom | 210/512.1 |

OTHER PUBLICATIONS

Smisson, B., "Design, Construction, and Performance of Vortex Overflows," Proc. Symp. on Storm Sewage Overflows, Inst. Civil Eng. (G.B.) 1967.

Field, R., "Design of a Combined Sewer Overflow Regulator/Concentrator," Journal WPCF, vol. 46, No. 7, Jul. 1974.

Primary Examiner—Ernest G. Therkorn
Attorney, Agent, or Firm—Cushman, Darby & Cushman

[57] ABSTRACT

A solids-liquid separator comprises a basin in which liquid containing solids is introduced from an inlet port of the basin in a direction tangential to the side wall of the basin so as to produce a swirling flow of the liquid. The swirling flow also generates a secondary flow, and both flows promote the floating of floatable solids on the surface and the settling of settlable solids on the bottom. The solids floating on the surface are discharged by the overflowing liquid and the settled solids are discharged through a discharge pipe opening at the bottom of the basin. The liquid from which solids are separated is discharged outwardly from an outflow opening of the basin independent from the discharge of solids. The inlet port and outflow opening are separated circumferentially with respect to the flowing direction so that the circumferential separation thereof subtends at least 180 degrees about the center of the basin.

16 Claims, 50 Drawing Figures

Fig. 16
Fig. 19
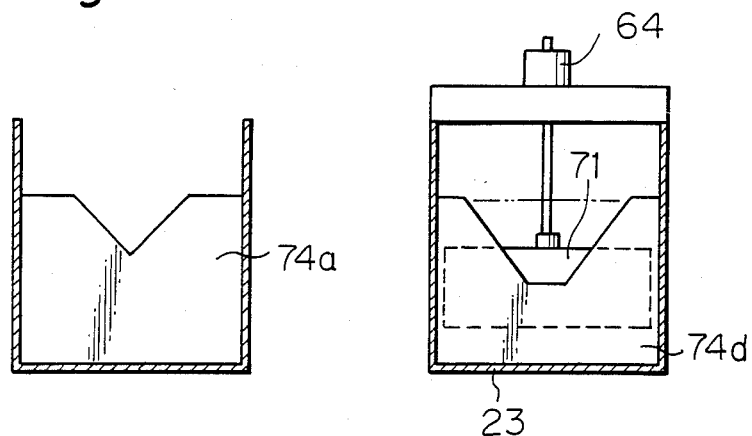
Fig. 17    Fig. 18
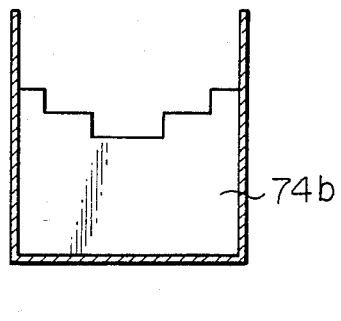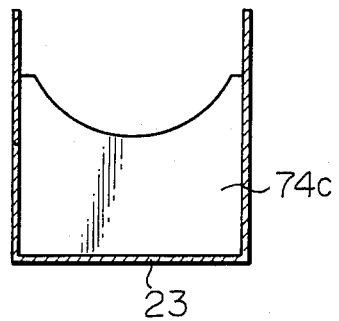

SOLIDS-LIQUID SEPARATOR

FIELD OF THE INVENTION

The present invention relates to a solids-liquid separator for separating solid items from liquid and more particularly a separator for separating solid items from sewage, especially when the amount of sewage flowing into a sewage treating plant is temporarily increased beyond the capacity of the plant.

BACKGROUND OF THE INVENTION

Sewerage systems have been developed to improve public hygiene, and promote acceptable urban life. A sewerage system is generally intended to collect waste water and discharge it after it is treated so as to not contaminate the rivers or sea.

For such treatment, there are two kinds of systems in general, one being a so-called combined sewerage system in which rain water or surface run off and other waste water such as domestic or industrial waste water are collected by means of the same pipe or sewer discharging to the plant, and the other being a separate flow system in which rain water is collected separately from other waste water. For instance, regarding the area of Tokyo, the combined system is widely employed relative to the separate system.

In the combined system, however, there is a problem that, when the amount of rain water is increased beyond a certain level, the water fed to the treating plant may over-flow, and such excess water including contaminants may flow into the river or sea thereby causing pollution. Therefore, it is preferable to process such excess water by removing solid items therefrom.

Also, there is usually a regulation which restricts the discharge of such untreated excess water to the river or sea. In Japan, the Ministry of Construction regulates the capacity of sewerage treating plants so as to be capable of processing three times the ordinary amount of sewerage flowing under clear or dry weather conditions. Accordingly, if heavy rain falls to an extent beyond the maximum capacity of the plant, sewerage overflows to the rivers and sea anyway so in the amount flowing to the plant to in excess of three times the nominal amount in Japan.

Therefore, there has been a need for separating as much as possible solid items contained in the excess sewage to prevent environmental pollution.

One of the apparatuses adapted to separate solid items from sewage water if the amount of sewage is beyond the predetermined limit has been a swirl flow regulator.

The swirl flow regulator or separator is useful in separating solid items from the sewage so as to discharge excess water to the river without causing the serious problem of pollution. However, the prior art swirl flow regulator is not completely satisfactory since there are several drawbacks in this type of separator as summarized below.
a. Separating rate of floatable solids is low:
b. Discharging of the floatable solids can be effected only after the overflowing condition has diminished;
c. Discharging of sedimentation is not easy; and
d. Possibility of blockade may be encountered.

For better understanding of the present invention, further details of the swirl flow regulator will be discussed later.

SUMMARY OF THE INVENTION

Accordingly, it is an object of the present invention to provide an apparatus for separating solid items which is free from the drawbacks mentioned above.

It is also an object of the present invention to provide an apparatus for effectively separating solid items from sewage when the amount of the sewage flowing to a treating plant temporarily exceeds the capacity of the plant so that excess water may be treated before being discharged to the river.

The above objects are accomplished by the solids-liquid separator according to the present invention.

In the present invention, the separator comprises a basin which includes a cylindrical side wall and a bottom wall, with sewage is introduced into the basin generally in a direction tangential to the cylindrical wall. The separator is provided with an over-flowing means into which the overflowing water is discharged after travelling around more than 180° of the circumference of the cylindrical side wall with the solids separated as much as possible therefrom. The separated solids, both floating and sedimented, are directed to the sewerage treating plant while the excess water is discharged to the river through an outflow opening in the basin.

The separation of solids from sewage is effected by utilizing the swirling flow and a secondary flow induced by the swirling flow coming in to the basin from the combined sewer tangentially to the side wall, the secondary flow serving to cause the light solids to float and the relatively heavy solids to settle so that light and heavy solids may be directed to the sewerage treating plant.

The present invention will be explained hereunder referring to the accompanying drawings, brief explanation thereof being summarized below.

BRIEF EXPLANATION OF THE DRAWINGS

FIGS. 16 through 19 show several alternative weirs;

DETAILED DESCRIPTION OF THE PREFERRED EMBODIMENTS

For facilitating the understanding of the present invention, the separator of prior art will be briefly touched upon as noted hereinabove before explaining the preferred embodiments according to the present invention.

Figure 1:
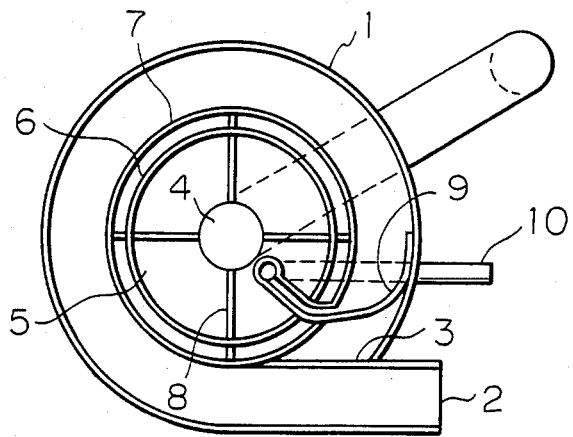
FIG. 1 is a plan view showing a swirl flow regulator of prior art.
Figure 2:
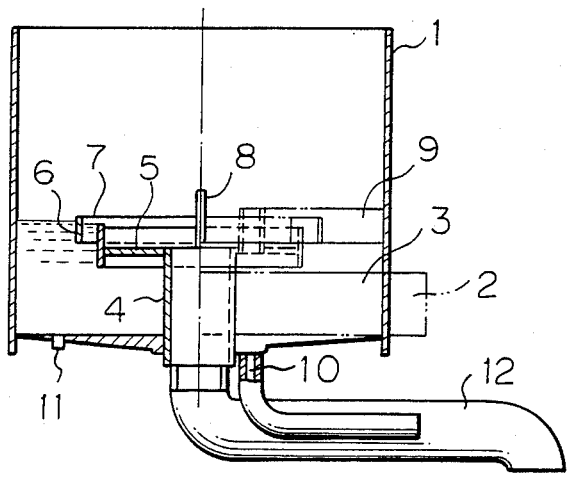
FIG. 2 is a side view of the regulator shown in FIG. 1 partially in cross section.

FIGS. 1 and 2 illustrate a plan view and a partially sectional side view of a swirl flow regulator of prior art, respectively.

The swirl flow regulator comprises a basin having an outer cylindrical shell 1, a feeding channel 2 for directing sewage from the combined sewer duct into the basin in a direction generally tangential to the side wall of the shell 1, a direction control plate 3 for causing the incoming sewage to follow the path along the inner circumferential portion of the basin, a down shaft or standpipe 4 adapted to direct the "treated water" to the river, a water collecting tray 5 mounted at the top of the standpipe 4, an overflow weir 6 surrounding the periphery of the tray 5, a scum ring 7 outwardly surrounding the tray 6 and spaced therefrom for preventing floating solid items or scum from entering the standpipe 4, spoilers 8 for coupling the scum ring 7 to the tray 5 and adapted to reduce the kinetic energy of swirling water between the scum ring and the overflow weir so as to increase the capacity of the standpipe in order to raise the separation efficiency, a scum trap 9 trapping the floating items on the surface of the water to direct them to the underside of the tray 5, a sewage discharge conduit 10, a guide groove 11 coupling the channel 2 with the conduit 10 for preventing deposition of solids during dry weather and a treated water outflow pipe 12. In the foregoing, the term "treated water" is employed for convenience to designate the sewage water from which solids have been removed to an extent sufficient to allow it to be discharged to the river. Therefore, the term "treated water" is not intended to designate completely clean water. It is to be noted that this term will be used throughout the present specification and the appended claims in the same meaning.

The incoming sewage during rain or after rain is introduced into the basin through the channel 2 in the direction tangential to the side wall of the shell 1 and guided by the control plate 3 so as to be rotated around the downshaft 4 with an accompanying rise in flow-rate during which settlable solids are gathered at the central portion of the basin bottom by gravity and inertia and directed to the treating plant through the discharge pipe 10, the floatable items are intercepted by the scum ring 7 and moved with the rotating flow toward the scum trap 9 so as to be trapped and then induced to the lower side of the tray 5 where the floatable items are retained by the lower portion of the weir 6 and the treated water is discharged to the river through the downshaft 4 with the rotational flowing energy being reduced by the spoilers 8. The retained floatable items at the underside of the tray 5 are discharged through the discharge pipe 10 when the level of water within the basin is lowered. The swirl flow regulator explained above is to some extent satisfactory; however, as explained hereinbefore, there are inherent drawbacks as further discussed below.

(a) Separating rate of floatable solids is low:

Because the floatable solids are not discharged while the regulator is performing its separating function, the capacity of retaining such floatable items is naturally limited. Thus, if the accumulation of floatable solids exceeds the retention capacity, the floatable solids may flow with the overflowing water directed to the standpipe 4 and thus the separating rate must be lowered in case the level of the water within the basin is raised such as to overflow the weir 6 whenever floatable solids are accumulated beyond the retention limit.

(b) Floatable solids are not discharged simultaneously with the separation:

As explained above, separated floatable solids are accumulated at the lower side of the tray 5 and they will not be discharged until the water level is lowered. Therefore, the separation rate is lowered so that the amount of the floatable solids discharged with the overflowing water may become larger than the amount of the floatable solids separated.

(c) Discharging of the settled solids is not easy:

The provision of the scum ring and the scum trap interferes with the generation of induced secondary flow within the basin and, thus, the solids of high specific gravity tend to stay at the position where they have settled and hardly move to the discharge pipe 10. Therefore, such settled solids have to be displaced manually during dry weather, and thus maintenance of the regulator is troublesome and expensive.

(d) Tendency to choke is high:

Because of the provision of the scum ring and the scum trap, the possibility of entanglement of large solids around the scum ring and the scum trap is highly likely to be encountered.

Accordingly, the present invention is set forth to solve the above drawbacks of the prior art.

Figure 3:
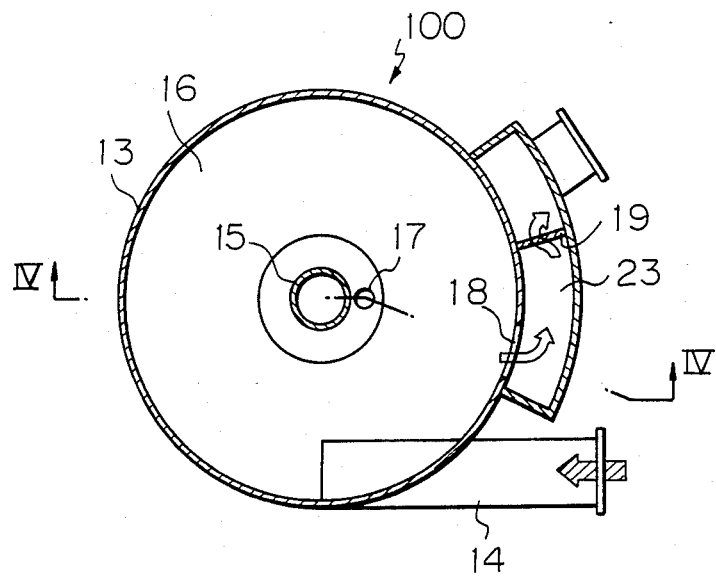
FIG. 3 is a horizontal cross sectional view, taken along the line III—III in FIG. 4, of a solids-liquid separator according to the present invention.
Figure 4:
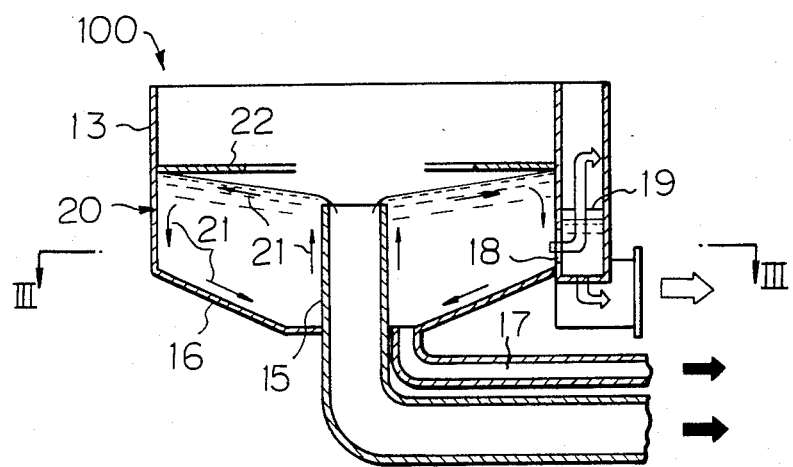
FIG. 4 is a cross sectional view of the separator shown in FIG. 3 taken along the line IV—IV in FIG. 3.

An embodiment of the present invention is illustrated in FIGS. 3 and 4 as a solids-liquid separator 100 comprising a basin 20. The basin is constituted by a side wall 13 and a bottom plate 16, the side wall 13 being circular or spiral in shape. At the lower portion of the basin 100, an inlet channel 14 is provided so as to direct the incoming flow into the basin at the side wall 13 or the bottom plate 16 or at a border zone between the side wall 13 and the bottom plate 16. The cross sectional shape of the channel 14 is optional but the orientation of the inlet channel 14 is devised so that incoming sewage is preferably directed in a direction tangential to the side wall to cause a swirling flow of the sewage. An overflow pipe 15 is provided at the center of the basin 20 and standing upright within the basin 20. The pipe 15 extends through the bottom plate 16 and serves to direct the overflowing water to the treating plant. A discharge pipe 17 is also coupled to the bottom plate 16 adjacent to the overflow pipe 15 so as to deliver the settled solids to the treating plant. An outflow opening 18 for passing the treated water is provided in the side wall 13 at the portion remote from the inlet channel 14 with respect to the flowing path of the sewage within the basin 20. The outflow opening 18 is positioned higher than the bottom plate 16 and lower than the expected level of the water or the upper open end of the overflow pipe 15. However, in a case where the bottom plate is inclined, the outflow opening 18 may be partially or completely located in the bottom plate. The position is determined so that the solids contained in the incoming sewage from the inlet channel 14 either settle on the bottom plate or float on the central portion of the water surface as a result of the swirling flow and induced secondary flow. The induced secondary flow will be explained later. The treated water is discharged through the outflow opening 18 to an outflow passage 23 leading to the river. In the outflow passage 23, an outflow weir 19 is disposed so that the water is discharged from the solids-liquid separator 100 when the level in the passage is above the height of the weir 19. This weir is provided to prevent the highly concentrated dirty water from being discharged to the river, especially at the initial stage of rain fall. At this initial stage of rain fall, a so-called "first flush" takes place and solids including organic materials may flow into the combined sewer with high concentration, and thus the weir 19 serves to prevent such highly contaminated water from being discharged to the river. Such highly contaminated water is directed to the treating plant through the discharge pipe 17 at the initial stage of rain fall.

During the normal operation of the separator 100, the water flow around the outflow opening 18 is swirling along the side wall 13 and, thus, the solids within the basin 20 are moving with the swirling flow and will not change their moving direction abruptly at the outflow opening 18 into the passage 23 due to inertia; however, the water may flow into the passage 23 due to the difference in water level. Therefore, the treated water flowing through the outflow passage is not accompanied by the solids. Further, the position of the outflow opening 18 gives the advantage that floatable solids may be floating at the center of the water surface and the settlable solids settled on the bottom due to the swirling flow and the secondary flow induced by the swirling flow.

An annular stabilizing plate 22 is disposed in the basin 20 to prevent wavy motion of the water at the position above the upper open end of the overflow pipe 15. The practical height of the stabilizing plate 22 is determined by the amount of overflowing liquid, the speed of the swirling flow, etc. As the amount of incoming sewage increases, the level of the water within the basin 20 is raised. When the level reaches the upper end of the overflow pipe 15, the overflowing water is directed into the overflow pipe 15 with the floatable solids. In the outflow passage 23, the treated water is discharged outside when the level is above the height of the weir 19.

Next, the motion of the swirling flow will be reviewed. When the sewage water from the combined sewer is introduced into the solids-liquid separator 100 through the inlet channel 14, the water is caused to swirl to produce a primary flow within the basin 20. Due to friction, the liquid near the surface of the water moves more rapidly than the liquid near the bottom plate 16 of the basin 20 and, thus, the liquid near the surface is subjected to a stronger centrifugal force than the liquid near the bottom. Also, the pressure at a certain depth within the basin 20 is higher at the portion near the outer periphery than the portion near the center. The liquid near the bottom is not moving as rapidly in the circumferential direction as the rest and, thus, the centrifugal force thereof becomes relatively low. However, due to the swirling movement, the pressure gradient of the liquid near the bottom is large at the portion near the side wall 13 and small at the center whereby currents flowing towards the center will be produced and these currents will merge at the center to move upwardly and then diverge again at the surface into radial currents flowing towards the periphery which then move downward along the side wall 13 whereby an induced or secondary flow indicated by 21 is produced.

The secondary flow together with the primary flow serves to assist the floatable solids to rise quickly around the overflow pipe 15 and settle the settlable solids on the bottom plate 16. The floatable solids are discharged through the overflow pipe 15 and the settled solids are discharged through the discharge pipe 17 together with the water. The opening of the discharge pipe 17 is preferably positioned as closely as possible to the overflow pipe 15. The diameter of the pipe 17 is preferably small so as to reduce the amount of the water discharged therethrough; however, the diameter of this pipe 17 should be determined so as not to cause blockage of the pipe 17 by the settled solids. While the discharge pipe 17 is illustrated as a single element in FIGS. 3 and 4, it is possible to provide plural discharge pipes. The plural discharge pipes may be disposed around the overflow pipe 15.

Figure 4A:
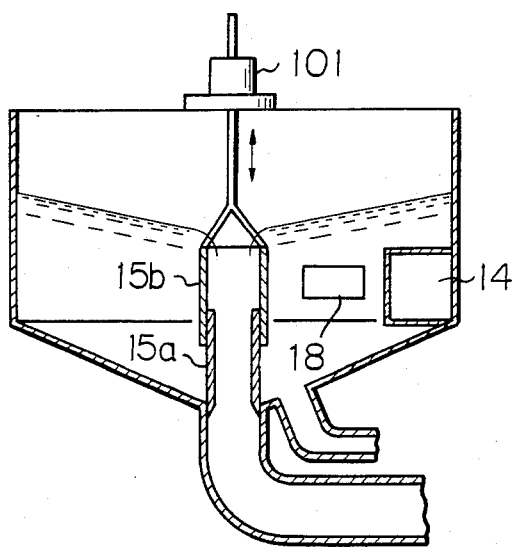
FIG. 4A is a modified view of the separator shown in FIG. 4.

The diameter of the overflow pipe 15 centrally upstanding within the basin 20 determines the amount of water which will overflow therethrough. In order to control the amount of the overflow, an orifice or other means may be disposed in the overflow pipe 15. The diameter of the overflow pipe 15 also gives some effect to the intensity of the secondary flow and the height of the overflow pipe is related to the capacity and efficiency of the separator 100. Accordingly, it is preferable to arrange the overflow pipe 15 to be adjustable in height. Such modification is illustrated in FIG. 4A wherein the overflow pipe is constructed in a telescopic mechanism comprising a movable pipe 15$b$ and a stationary pipe 15a, the pipe 15b being moved up and down by a lifting device 101.

The bottom plate 16 may be horizontal; however, if it is inclined as illustrated in FIG. 4, it enhances the secondary flow, promotes the separating efficiency and assists the settled solids to move towards the center.

In contrast to the swirl flow regulator of the prior art, the separator 100 according to the present invention effectively separates the solids and liquid in the sewage incoming from the combined sewer without encountering the drawbacks inherent in the prior art, while both utilize the phenomenon of sedimentation due to the differences in gravity and inertia acting on the solids and liquid. Thus, in this context, it may be said the both utilize the same phenomenon for separation. However, in the swirl flow regulator of the prior art, the secondary flow induced within the basin is generated, due to the presence of the scum rings and spoilers, between the cylindrical range corresponding to the scum ring and the outer peripheral surface of the side wall and, accordingly, the energy of the secondary flow is not large as compared to that in the present invention. Therefore, the tendency for settled solids to come together towards the center of the bottom surface is not as effective in the swirl flow regulator of prior art as compared with the present invention.

Also, efficiency for separating floatable solids in the prior art swirl flow regulator is not high due to the construction thereof, as hereinbefore explained.

Now while the construction of the separator according to the present invention is simple, it achieves the intended objects by utilizing the swirling flow (primary flow) and the enchanced secondary flow.

There are several possible modifications for the present separator which remain within the scope of the present invention.

Figure 5A:
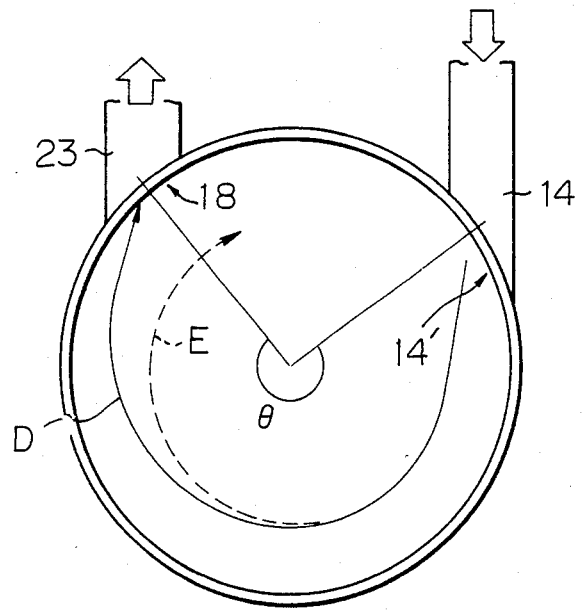
FIGS. 5A and 5B schematically show the positional relationship between the inlet port and outflow opening of the separator according to the present invention.
Figure 5B:
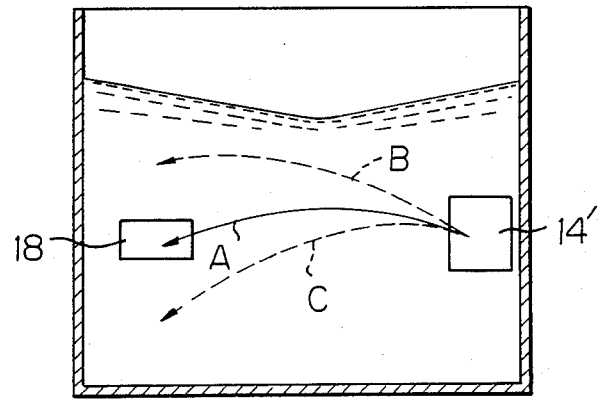

Before proceeding to an explantion of the other embodiments, for the convenience of explanation, the advantageous position of the overflow opening 18 explained in the foregoing is again reviewed, as illustrated in FIGS. 5A and 5B. While the positional relationship of the elements concerned as illustrated in FIGS. 5A and 5B is different from that of FIGS. 3 and 4, the same references are given in FIGS. 5A and 5B as analogous elements in FIGS. 3 and 4 for convenience and clarity, except for the inlet port which is given the reference 14'.

In order to separate the solids and liquid, it is required that the mixture or the sewage travel circumferentially within the basin for a certain distance. Thus, it is preferable to dispose the outflow opening 18 at a position remote from the inlet port 14' in terms of the direction of the swirling flow. This relationship is illustrated in FIG. 5A and it is preferable that the angular relationship "$\theta$" between the positions of the inlet port 14' and the outflow opening 18 is at least more than 180 degrees so that the travelling path of the incoming sewage is prolonged. As to the vertical position, this has been touched upon earlier but is illustrated in FIG. 5B. Due to the sewage travelling the distance corresponding to "$\theta$", the settlable solids will take the path "C" and the floatable solids will take the path "B" and the so-called "treated water" will move along the path "A" and be discharged through the opening 18. If the difference in specific gravity between the solids and liquid is large, the paths "B" and "C" will be more separated from the path "A" because the separating rate will be higher. In FIG. 5A, if the solids take the path "E" inside of the liquid path "D", the separation rate also becomes high.

Figure 6:
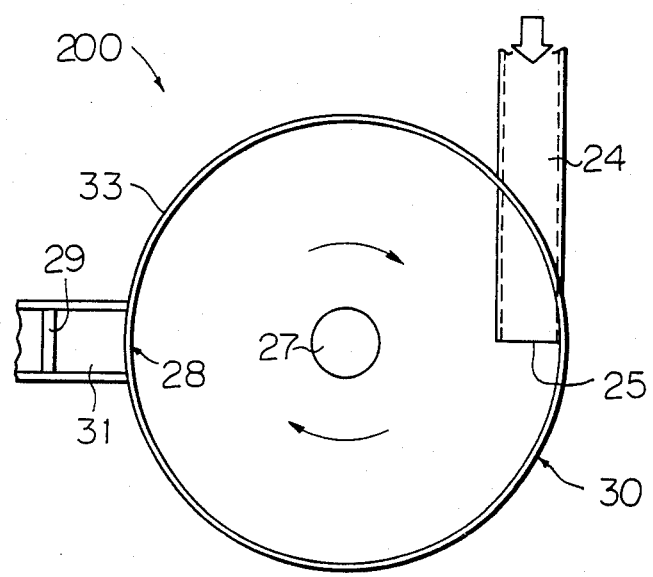
FIG. 6 shows a plan view of another embodiment according to the present invention.
Figure 7:
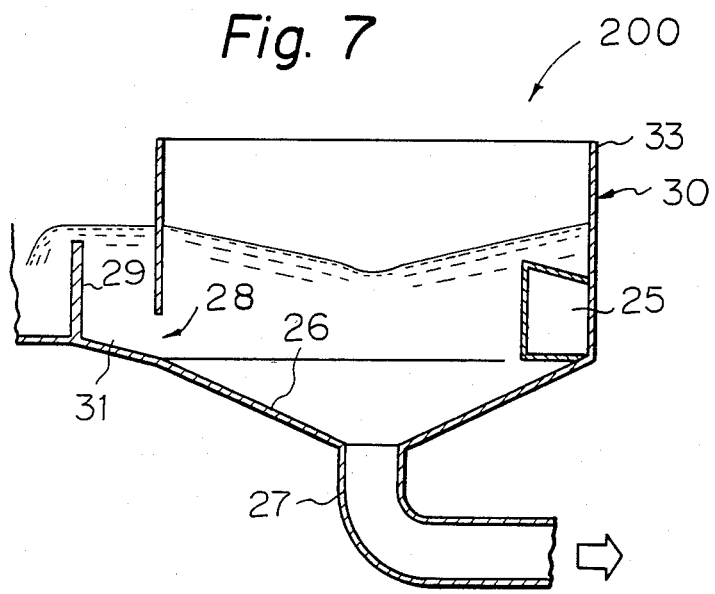
FIG. 7 is a cross sectional view of the separator shown in FIG. 6.

Referring to FIGS. 6 and 7, another embodiment according to the present invention is illustrated. A solids-liquid separator 200 shown in FIGS. 5 and 6 is particularly focused to the settable solids with a simple construction embodying the separation factor "$\theta$" in FIG. 5A. The incoming sewage from the combined sewer is received through an inlet channel 24 and an inlet port 25 into a basin 30 in a direction tangential to a side wall 33 of the basin 30 to cause swirling flow and secondary flow so as to settle the settleable solids on the bottom surface 26 of the basin, the bottom surface being preferably inclined downwardly to the center thereof so as to facilitate the gathering of settled solids in the center portion. At the center of the bottom surface 26, a discharge pipe 27 is coupled so as to discharge the condensed sewage with the settles solids to the treating plant. At a location which is downstream of the swirling flow, an outflow opening 28 is provided on the side wall 33, the opening being preferably disposed at a portion beyond at least 180 degrees downstream of the inlet port 25 along the circumference of the side wall 33 as explained in connection with FIGS. 5A and 5B. An outflow passage 31 is provided downstream of the outflow opening 28 and an overflow weir 29 is disposed within the passage 31. The height of the weir 29 is so arranged as to be higher than the upper edge of the outflow opening 28. Also, it is preferable to arrange the weir 29 so that its height is adjustable so as to be able to regulate the overflow. The water which overflows beyond the weir is discharged to the river as treated water.

Figure 8A:
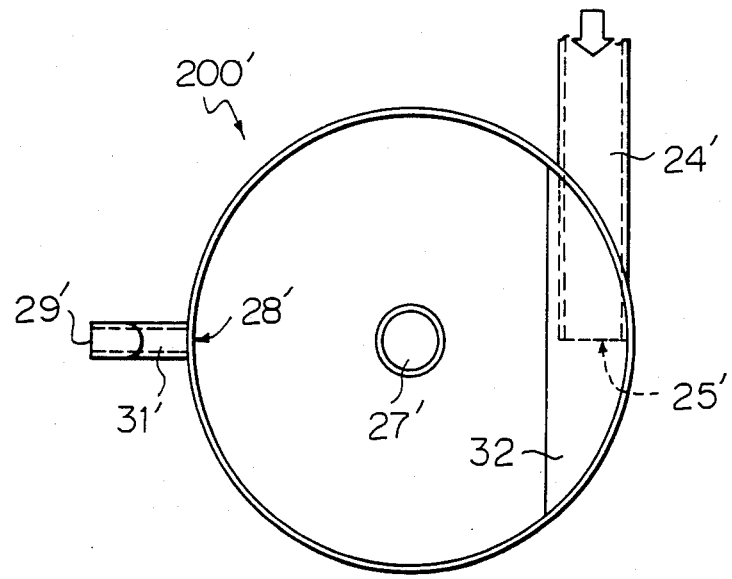
FIGS. 8A and 8B illustrate a further embodiment in plan view and cross section, respectively.
Figure 8B:
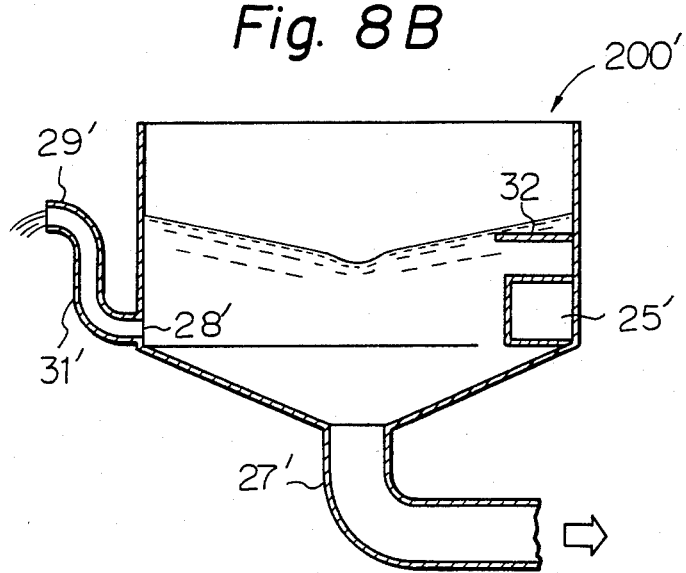

In FIGS. 8A and 8B, another embodiment is shown as a solids-liquid separator 200' according to the present invention. The separator 200' is somewhat similar to the separator 200 and differs therefrom with regard only to the overflow passage. The elements similar to those in FIGS. 6 and 7 are given the same reference numbers with prime added thereto, respectively. Therefore, the elements not specifically explained hereinafter, are to be referred to as having the same reference number as the corresponding elements of the separator 200 without prime.

In the separator 200', an outflow passage 31' is constructed as a pipe passage and, instead of a weir, an adjustable outflow pipe 29' is provided so that the open end of the pipe 29' is adjustable with respect to its height in order to regulate the discharging amount of the overflowing treated water. With such regulation, blockage of the pipe passage 31' may also be prevented. A plate 32 may be disposed within the basin so as to suppress the wave motion of the water.

The foregoing separators 200 and 200' are mainly focused on the settlement of solids. The floatable solids may be simply removed by using means other than an overflow pipe such as 15 shown in FIGS. 3 and 4. Such embodiments are explained below.

Figure 9A:
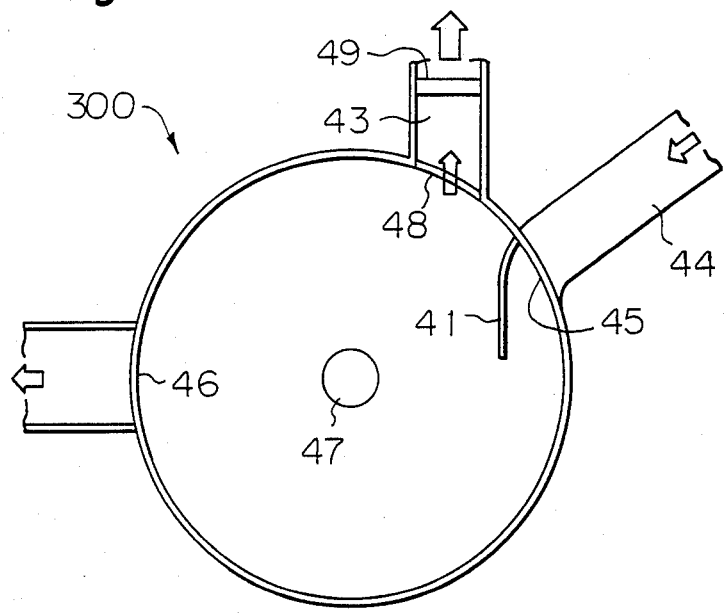
FIGS. 9A and 9B show a further modified separator according to the present invention in plan and cross sectional views, respectively.
Figure 9B:
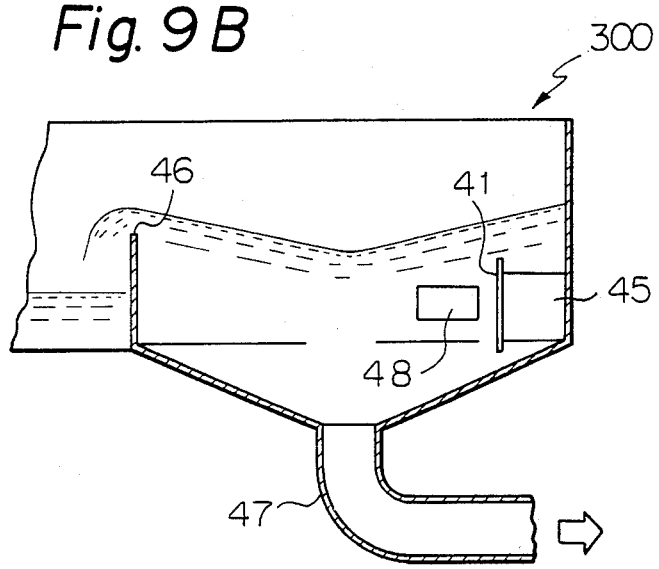
Figure 9C:
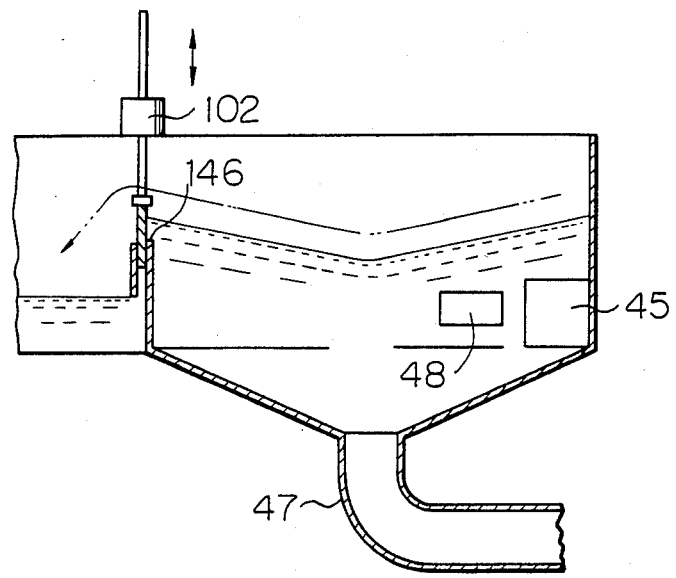
FIG. 9C is a modification of FIG. 9B showing an adjustable overflow means.

In FIGS. 9A and 9B, a further embodiment according to the present invention is illustrated as a solids-liquid separator 300. In this separator, 44 designates an inlet channel, 45 an inlet port, 47 a discharge pipe for directing solid concentrated water to the treating plant, 48 an outflow opening for passing the treated water, 43 an outflow passage leading to the river and 49 an overflow weir. The elements listed above serve to function in a similar manner to those previously explained under the same terms. At the side wall of the basin, a cutout opening 46 is provided so as to allow overflowing therefrom accompanying the solids floating on the surface. In FIG. 9C, a modified version of the cutout 46 is shown as 146, the height of which is adjustable up and down by a lifting device 102 for the purpose as explained in FIG. 4A. This overflow water is also directed to the treating plant. A separating plate 41 is disposed in front of the inlet port so as to direct the incoming flow in a direction tangential to the side wall of the basin and to enhance the swirling flow.

Figure 10A:
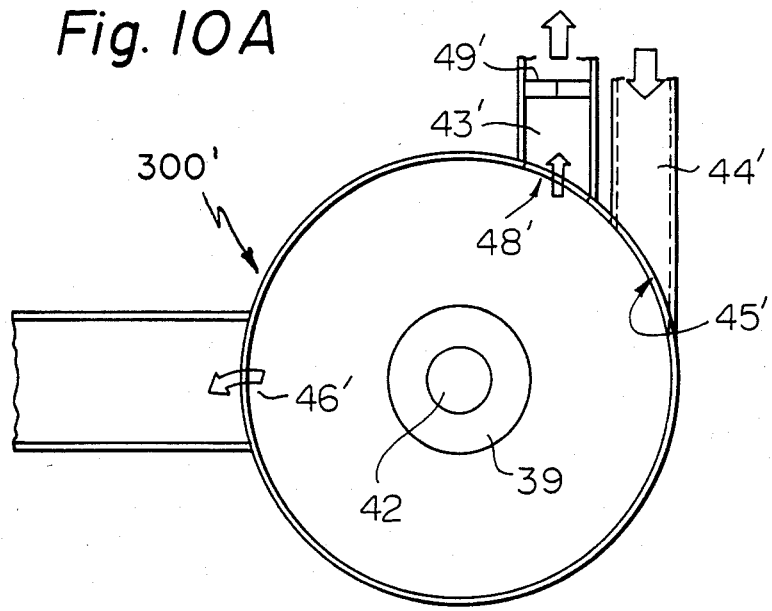
FIGS. 10A and 10B show another modification of the separator according to the present invention in plan and cross-sectional views, respectively.
Figure 10B:
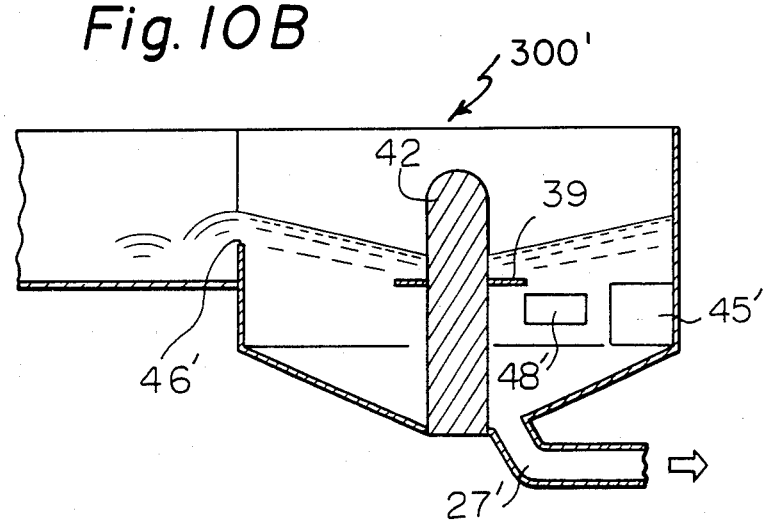

In FIGS. 10A and 10B, a solids-liquid separator 300' modified from the separator 300 is shown. In these drawings, the same references as those in FIGS. 9A and 9B are employed with prime for the respectively similar elements. In this separator, a central column 42 is disposed vertically. This column 42 serves to prevent generation of a vortex sucking air at the central portion of the basin when the water containing floatable solids overflows at the side wall. Also, a plate 39 may be provided for the same purpose as the column 42. The plate 39 and the column may be provided in combination as shown in FIGS. 10A and 10B or either of them may be disposed independently.

Figure 11A:
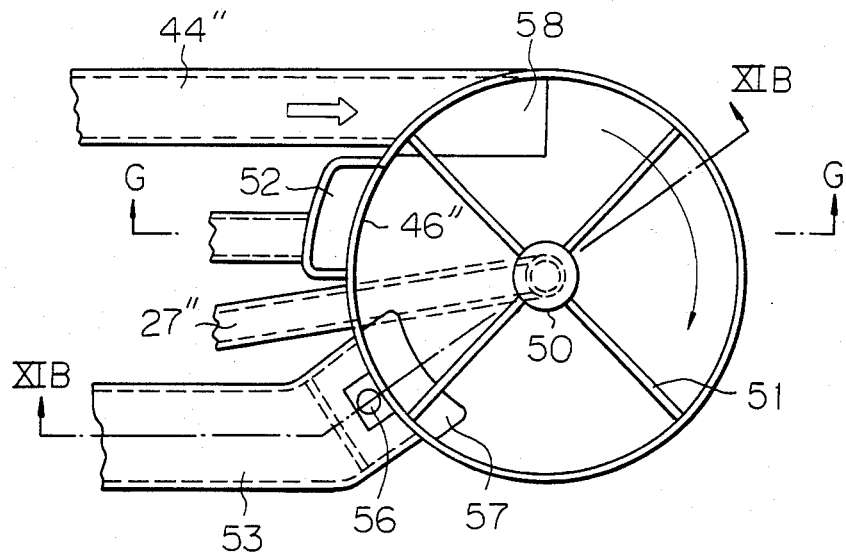
FIGS. 11A and 11B show a further modified separator in plan and cross-sectional views, respectively.
Figure 11B:
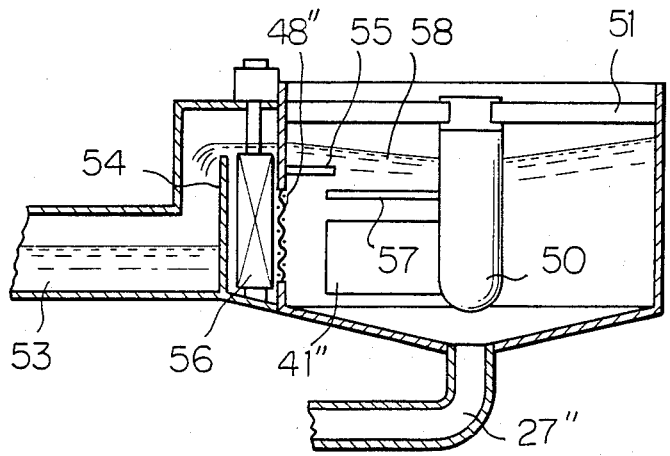

Another embodiment employing a vortex preventing means is shown in FIGS. 11A, 11B and 11C. A vortex preventing column 50 in this example is centrally suspended from an upper supporting spider 51 into the basin. The elements similar to those in FIGS. 10A and 10B are given the same references with double prime. In this embodiment, the overflowing water accompanying the floatable solids overflows outwardly through a cutout 46" at the side wall of the basin to a trough 52 and thence to the treating plant. The trough 52 is arranged to receive the water from the cutout 46"; however, the overflowing may be effected around the entirety of the circumferential upper edge of the basin if the trough 52 is arranged to encircle this circumferential edge. The so-called treated water passes through an outflow opening 48" to an outflow passage 53 leading to the river, a weir 54 being disposed in the passage 53. In this embodiment, a screen 55 is disposed at the outflow opening 48" to screen out the foreign items in order to further clean the water. It is to be noted that the provision of such screen is also applicable to the other embodiments. Any choking of the screen may be cleared by a remover 56 which may be a rotatable brush. Thus, the foreign items entrapped at the screen 55 may be discharged through the discharge conduit 27" or the trough 52 with the waters without requiring manual work during dry weather. Plate members 57 and/or 58 may be provided to stabilize the flow.

Figure 12:
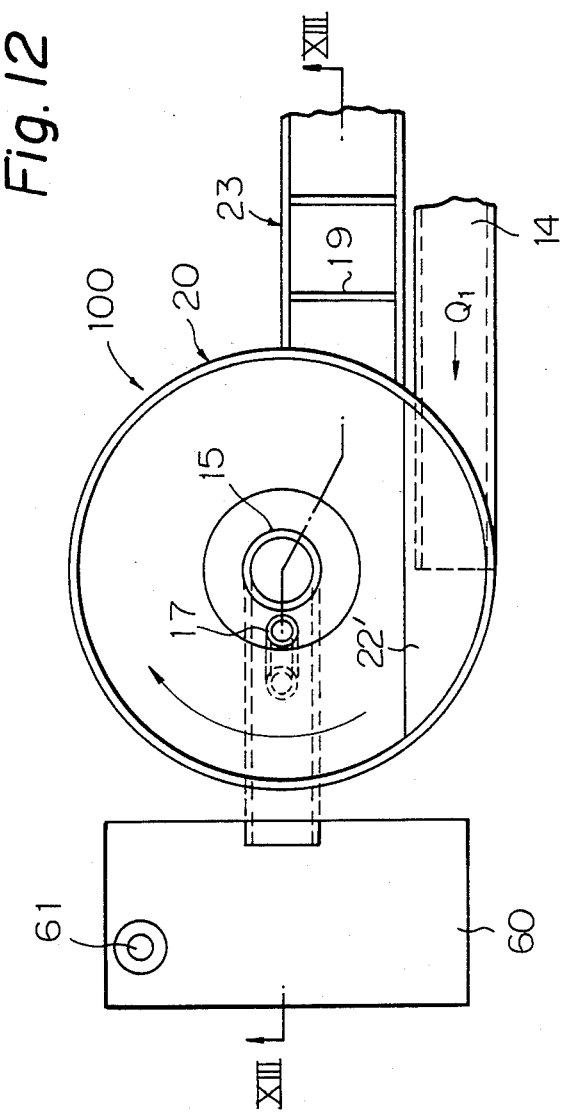
FIG. 12 is a schematic illustration of the separator shown in FIGS. 3 and 4 together with a flow controlling facility.
Figure 13:
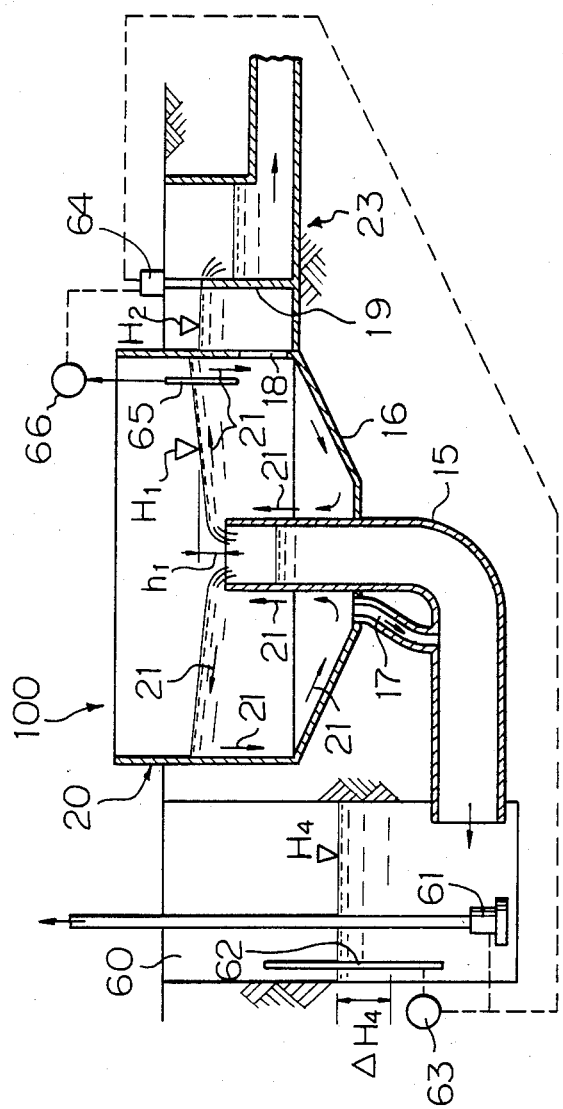
FIG. 13 is a cross sectional view taken along the line XIII—XIII in FIG. 12.

Now consideration will be given to the regulation of the flowing water in connection with the capacity of the treating plant. In FIGS. 12 and 13, the solids-liquid separator 100 which was explained with respect to FIGS. 3 and 4 is introduced again for the purpose of explanation. The separator 100 shown in FIGS. 12 and 13 is not completely the same as in the foregoing illustration but the employed references are the same since the elements bearing the same references are analogous. For instance, the discharge pipe 17 is merged to the overflow pipe 15 in FIG. 13 but it serves the same purpose as the pipe 17 in FIG. 4. Supplementary explanation is given below with respect to additional matters.

Figure 12A:
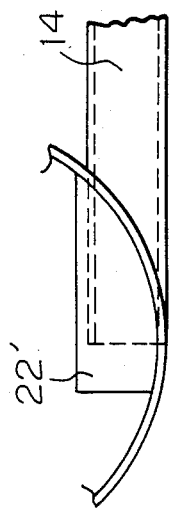
FIG. 12A is a modified fractional view of FIG. 12.

A stabilizing plate 22' is disposed above the inlet port of the inlet channel 14 so as to prevent any wave motion of the water surface within the basin 20 for facilitating the separation of solids on the basis of the difference in specific gravity. The stabilizing plate 22' may interfere with the secondary flow if its length is too long. Thus, the length is determined so as not to interfere with the secondary flow. An alternative example is shown in FIG. 12A as a plate 22". If the stabilizing plate 22' or 22" is disposed above the inlet port, the plate promotes the rigidity of the basin and no entanglement of foreign materials will occur since no supporting member therefor is present.

Downstream of the overflow pipe 15 and the discharge pipe 17, a storage tank 60 is disposed to temporarily store the water condensed with the separated solids which is pumped by a pump 61 to the treating plant.

A level detector 62 is disposed in the tank 60. The signal from the detector 62 is used to regulate the pump 61 through a controller 63 so that, when the level in the tank 60 exceeds a predetermined level $H_4$, the pump 61 is actuated and, when the level in the tank 60 decreases a certain volume corresponding to a predetermined amount of $H_4$, the pump 61 is deenergized. If the level still increases beyond $H_4$ even under the operation of the pump 61, then a signal is transmitted to a flow regulator 64 in the outflow passage 23 through the controller 63 so as to increase the outflowing amount of the treated water.

The number and the capacity of the pumps 61 may be appropriately determined and the regulation thereof may be made by controlling the revolutional speed of the pump, number of pumps to be actuated and the interval of the actuation either independently or in combination. At any rate, the maximum flow capacity of the pump(s) 61 is arranged to meet the maximum capacity of the treating plant and the flow regulator 64 is controlled to regulate the amount of the condensed water flowing into the tank below the maximum capacity of the treating plant (e.g., three times the nominal treating capacity during dry weather in Japan).

Another level detector 65 is disposed within the basin 20 to detect the water level therein and is adapted to generate a signal in response to variation of the level. This signal is also transmitted to the flow regulator 64 through a controller 66 so that when the level $H_1$ is raised, the amount of the outflowing water through the passage 23 is increased by the operation of the regulator 64. For instance, during or after heavy rain, the level $H_1$ would be raised because the incoming sewage through the inlet channel 14 is increased whereby the pressure head represented by $h_1$ in FIG. 13 is also increased so that the amount of the condensed water flowing into the tank 60 through the overflow pipe 15 and the discharge pipe 17 may exceed the capacity of the treating plant if the amount of outflow through the outflow passage 23 is not regulated.

Also, it would be preferable to provide an emergency pump in the tank 60. Weir 19, the flow regulator 64 and their associated elements will be explained.

Figure 14A:
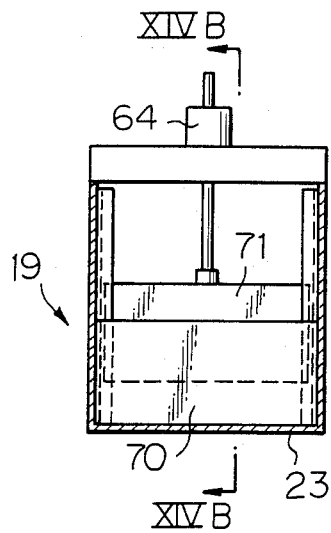
FIGS. 14A, 14B and 14C show a regulatable weir used in the separator shown in FIGS. 12 and 13.
Figure 14B:
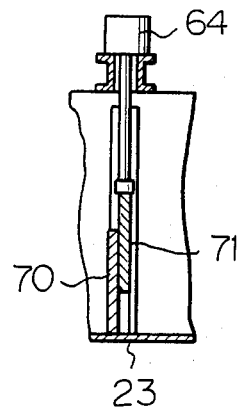

Referring to FIGS. 14A and 14B, weir 19 is constructed to comprise a stationary weir 70 and an up-and-down weir 71 which is moved by the regulator 64. While the regulator 64 has been explained to be controlled by the controllers 63 and 66, it may however be controlled by either one in practice, or by a combination of both.

Figure 14C:
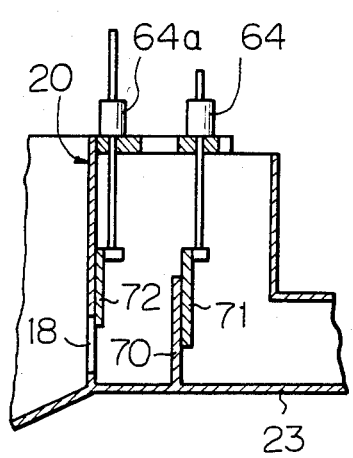

The arrangement shown in FIG. 14C illustrates another embodiment of the flow regulating mechanism. This mechanism utilizes the same means as that illustrated in FIGS. 14A and 14B and, in addition, employs a movable shutter 72 at the outflow opening 18 to regulate the flow passing the opening 18. Up and down movement of the shutter 72 is contolled by a regulator 64a similar to the regulator 64.

Figure 15A:
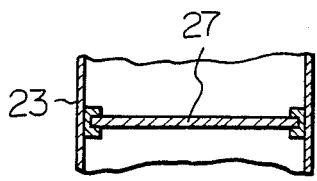
FIGS. 15A and 15B show a combination of weir plates constituting a weir.
Figure 15B:
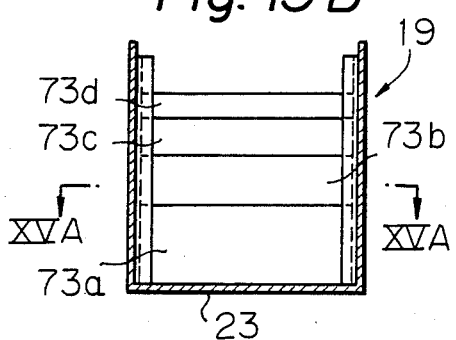

The example shown in FIGS. 15A and 15B is another modification of weir 19. Weir 19 is comprised of several plates 73a, 73b, 73c, 73d . . . of different heights so that the desired height of the weir is obtained by combining different plates. The combination of them may be performed manually.

In order to increase the discharging amount of the treated water in the passage 23 when the level $H_2$ upstream of weir 19 is increased, it would be beneficial to devise an appropriate shape for the weir plate. Such consideration is represented in FIGS. 16 through 20. In each of these drawings, an elevational view of weir plates 74a, 74b, 74c and 74d is shown, each having a different shaped notch at the upper edge so that, as the value of $H_4$ increases, the increasing rate of the overflowing treated water beyond the weir may be increased. In FIG. 19, a combination of the up-and-down plate 71 is illustrated.

Figure 20A:
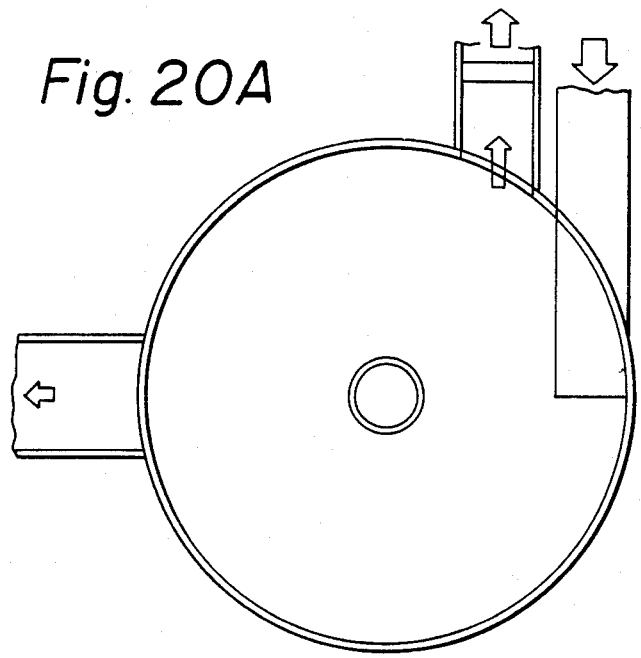
FIGS. 20A and 20B show another type of the separator.
Figure 20B:
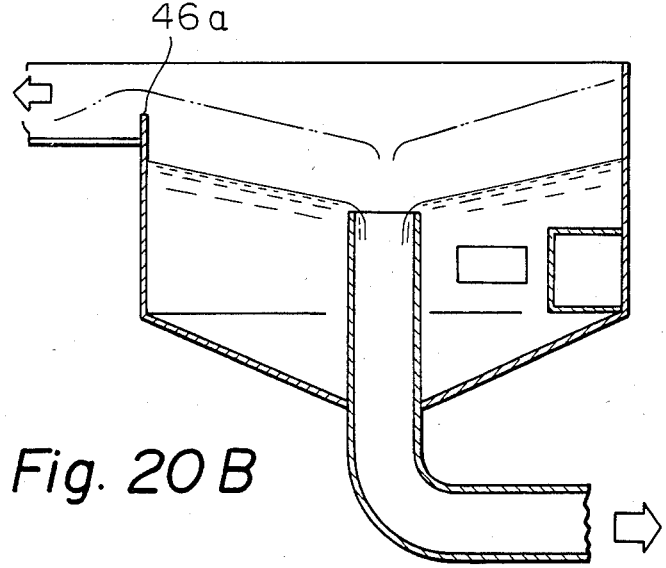

In FIGS. 20A and 20B, a still further embodiment according to the present invention is schematically illustrated. This embodiment is applicable in a case where settleable solids are not present in the incoming sewage. Under such a condition, the discharge pipe for the settled solids is not required. Also, if the cutout 46a is provided at the side wall of the basin at a place higher than the ordinary water surface obtaining under conditions of rain fall and the downstream thereof is directed to the river, the extraordinarily increased water as indicated by the chain-line may overflow from the cutout 46a to the river whereby flooding around the separator may be prevented.

While the swirl flow regulator is not the sole prior art in relation to the present invention, experiments were conducted to confirm the advantageous feature of the present invention with reference to the swirl flow regulator.

The test apparatuses corresponding to FIGS. 1 and 2 (swirl flow regulator) and to FIGS. 3 and 4 (the present invention) were employed and plastic particles having a diameter range of 2-3 mm were substituted for the solids.

Figure 21:
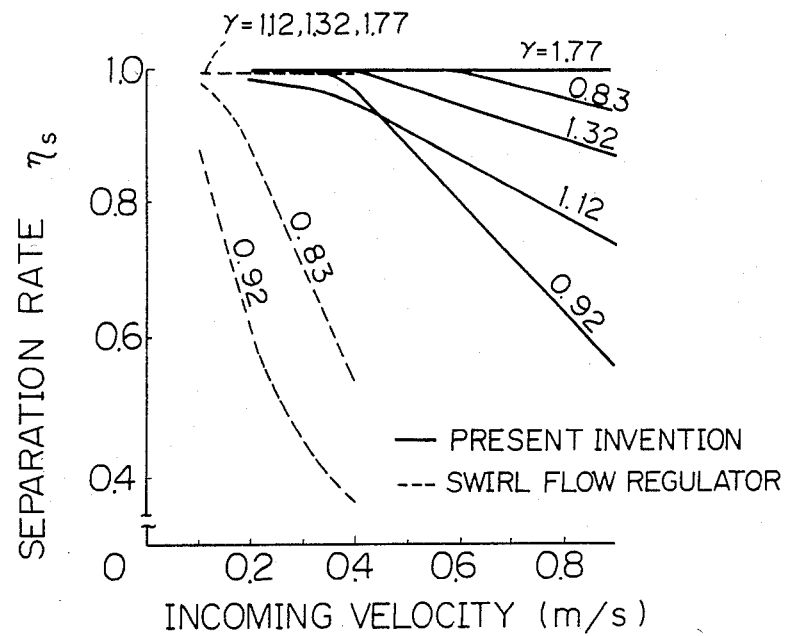
FIG. 21 illustrates data comparing the separating rate between the prior art equipment and the separator according to the present invention.
Figure 22:
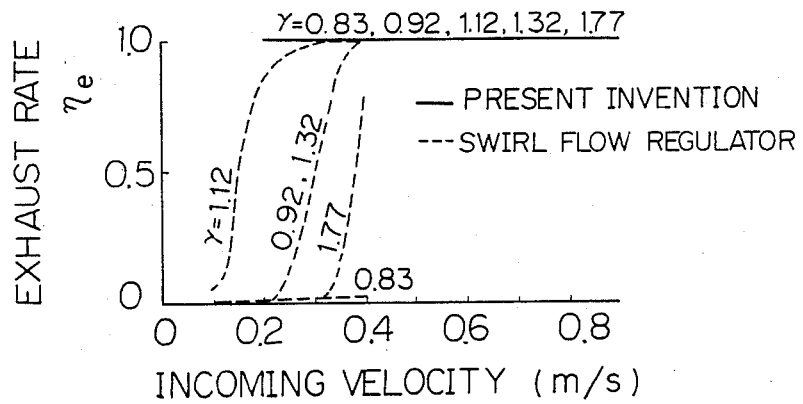
FIG. 22 also illustrates data comparing exhaust rate between the prior art equipment and the separator according to the present invention.

The results are shown in FIGS. 21 and 22. In FIG. 21, the separating rate $\eta_s$ is shown relative to the incoming velocity and in FIG. 22, the exhaust rate $\eta_e$ is shown relative to the incoming velocity. The separating rate $\eta_s$ is defined by the ratio: (weight of solids discharged outside of the basin)+(weight of solids accumulated in the basin)/(weight of solids charged into the basin); and the exhaust rate $\eta_e$ is defined by the ratio: (weight of solids discharged outside of the basin)/(weight of solids discharged outside of the basin)+(weight of the solids accumulated in the basin).

In FIGS. 21 and 22, parameter $\gamma$ is employed, and $\gamma$ is the specific gravity of solids used in the tests.

As the incoming velocity is increased, the separating rate $\eta_s$ is increased in both but the exhaust rate $\eta_e$ is constantly superior in the present invention compared to that in the swirl flow regulator. It is noted that the incoming velocity is closely related to the amount of the water to be processed. In the swirl flow regulator, the incoming velocity was limited to 0.4 m/s since the water level in the basin is increased to cover the scum ring and scum trap when the incoming velocity increased beyond this value. In contrast, due to the limitation of the measuring devices, a velocity over 0.9 m/s was not tested but it was confirmed that the solids-liquid separator according to the present invention can process large volumes, more than twice that of the amount that can be processed in the swirl flow regulator.

In the foregoing explanation regarding the several embodiments, modification of the respective embodiments were occasionally touched upon to some extent. Before concluding the description, several modifications will be further explained.

Figure 23:
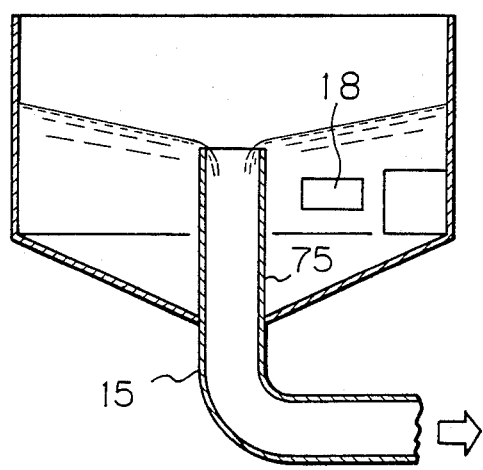
FIG. 23 shows modification of a discharge pipe at the bottom of the basin.
Figure 31A:
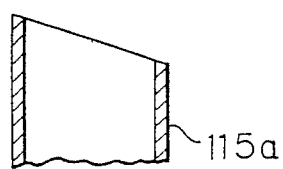
FIGS. 31A and 31B show modified overflow pipes at the upper ends thereof.
Figure 31B:
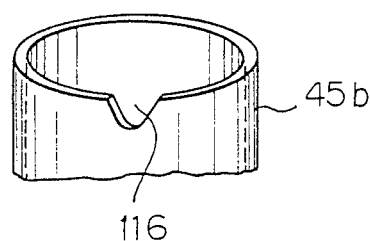

Firstly, regarding the overflow pipe 15 and the discharge pipe 17 shown in FIGS. 3 and 4, the merging thereof was explained in connection with FIG. 13. If the discharge port 75 is provided at the wall of the overflow pipe 15 within the basin and adjacent to the bottom as illustrated in FIG. 23, the discharge pipe 17 may be omitted. Also, the upper end of the overflow pipe may be modified such as shown in FIGS. 31A and 31B. In FIG. 31A, the upper end of the overflow pipe 115a is cut diagonally. In FIG. 31B, the circumferential edge of the overflow pipe 115b is provided with a notch 116. The configuration of the notch 116 may take another shape, for example, similar to those shown in FIGS. 16 through 19. By these modifications, the depth of the water passing these modified portions is partially increased so that larger solids may pass therethrough.

With respect to the direction guide plate or separating plate 41 shown in FIGS. 9A and 9B, there are several modifications. The plate 41 serves to direct the incoming flow tangentially to the side wall of the basin.

Figure 24:
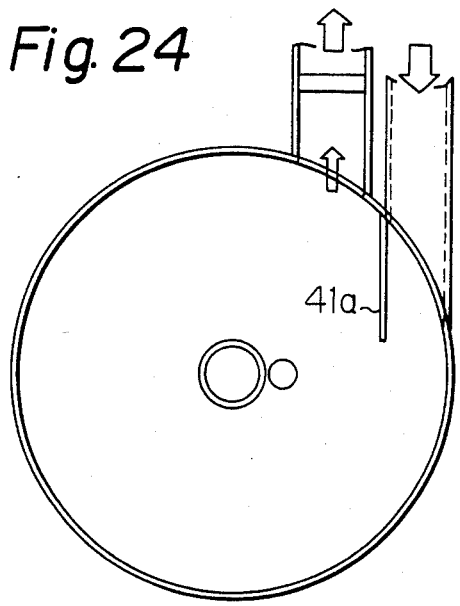
FIG. 24 illustrates a modified guide plate with the basin.
Figure 24A:
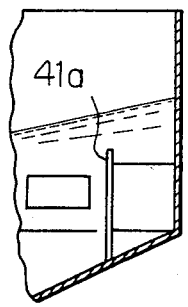
FIG. 24A shows a side view of the guide plate shown in FIG. 24 in fractioned view.

In FIGS. 24 and 24A, another guide plate 41a is shown and this plate serves to preserve the kinetic energy of the incoming flow to generate an active swirling flow.

Figure 25:
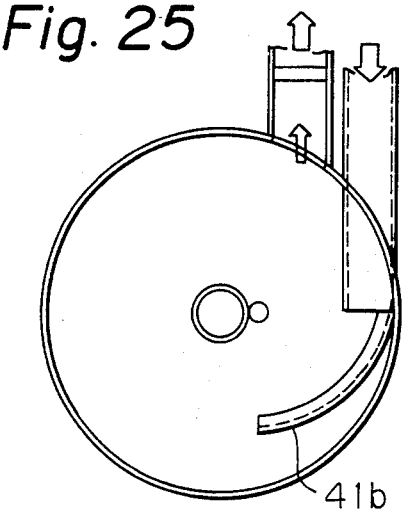
FIG. 25 shows another guide plate in a plan view.
Figure 25A:
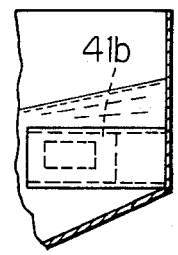
FIGS. 25A and 25B are fractional side views of FIG. 25.
Figure 25B:
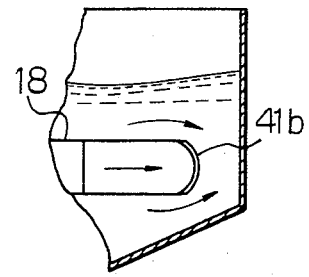

A guide plate 41b shown in FIGS. 25, 25A and 25B is provided to direct the incoming flow inwardly relative to the side wall of the basin. In this way, the solids are also directed inwardly so that the solids move inwardly from the outflow opening 18 whereby the separating rate is promoted. Also, the flow past the portion near the outflow opening 18 may pass the space between the guide plate 41b and the side wall but the solids have been settled or floated and, thus, possibility of solids flowing into the outflow opening 18 is low. The sectional shape of the plate 41b is illustrated as semi-circular; however, it may be a plain plate or a channel cross section. Also, stays may be added to support the guide plate.

Figure 26:
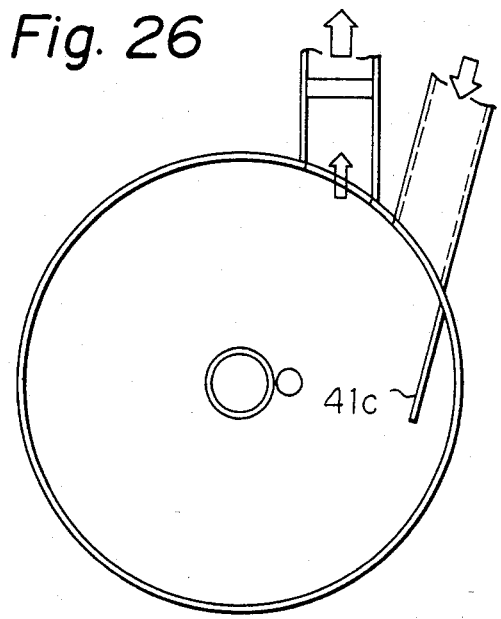
FIGS. 26 and 26A show another guide plate in a plan view and a fractional side view, respectively.
Figure 26A:
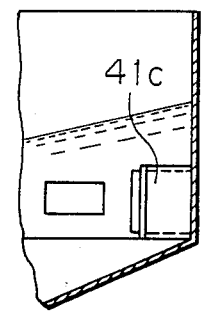

A guide plate 41c shown in FIGS. 26 and 26A is to serve the same purpose as that of the guide plate 41b.

Figure 27:
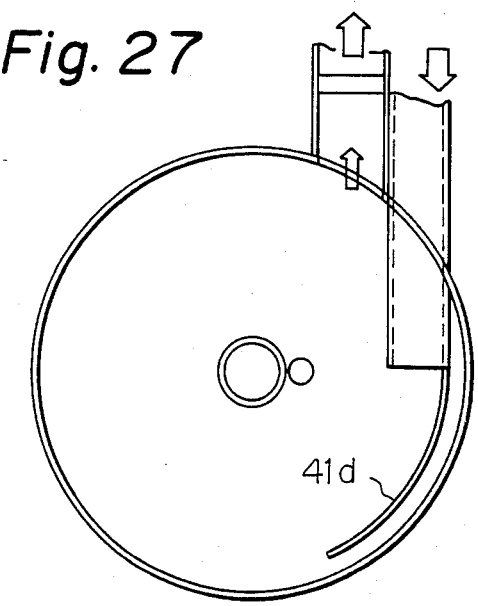
FIGS. 27 and 27A show a still further modification of the guide plate in a plan view and a fractional side view, respectively.
Figure 27A:
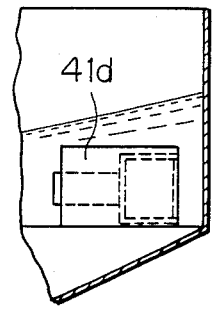

A guide plate 41d shown in FIGS. 27 and 27A is provided to guide the incoming flow to follow the passage parallel to the side wall but spaced therefrom. This provision also serves to assist in gathering solids towards the center.

Figure 28A:
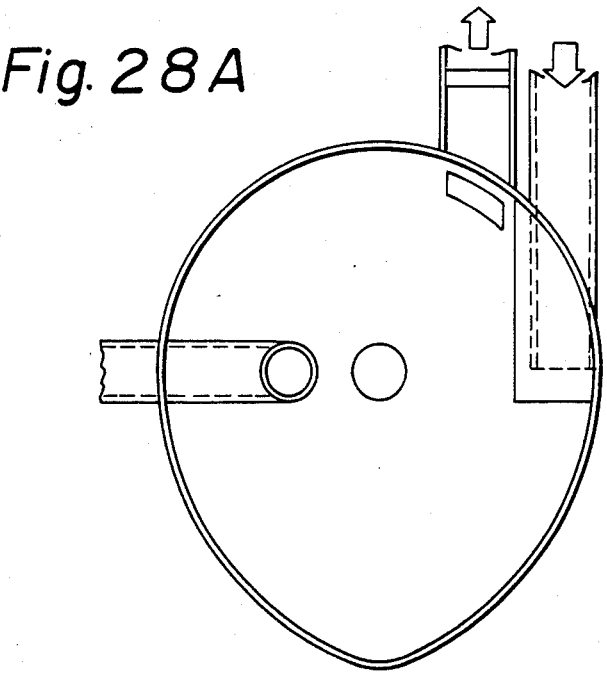
FIGS. 28A and 28B show a horizontally cross sectional view of the modified basins respectively.
Figure 28B:
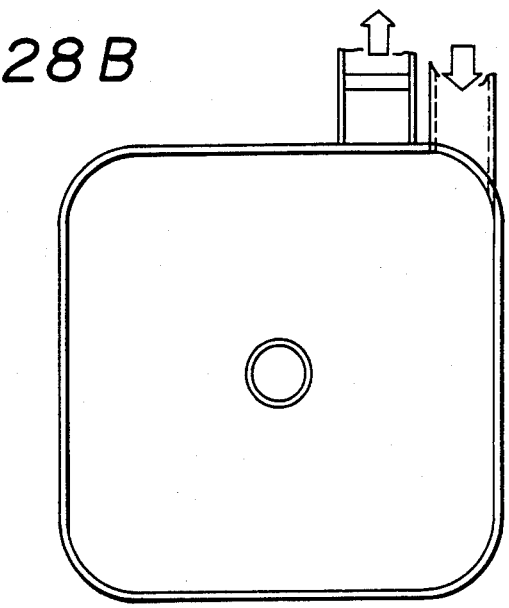

Regarding the shape of the basin, all of the foregoing illustration, have been shown as a cylindrical shape, i.e., circular in its horizontal cross section. However, if the swirling primary flow and the secondary flow can be generated, any other shape is optional. Some modifications in the shape are shown as elliptical or square in FIGS. 28A and 28B, respectively.

Figure 29:
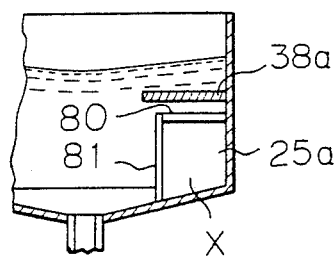
FIG. 29 shows a modified inlet port.
Figure 30:
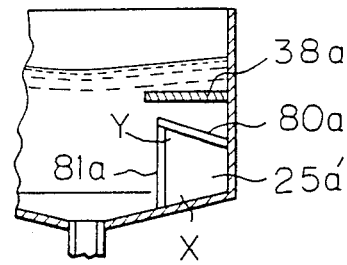
FIG. 30 also shows another inlet port.

Referring now to FIGS. 29 and 30, modification with respect to the inlet port will be touched upon. An inlet port 25a shown in FIG. 29 is formed by using a part of the bottom wall which is downwardly inclined toward the center of the basin. Thus, the settlable solids are caused to move towards the portion marked "X" thereby facilitating the separation of solids.

An inlet port 25A' shown in FIG. 30 is almost the same except for an upper member 80a which is upwardly inclined towards the center so that floatable solids may move towards the portion marked "Y" thereby facilitating the separation of floatable solids. Stabilizing plates 38a and 38a' are shown above the inlet ports, respectively. Top members 80 and 80a and side members 81 and 81a may be extended to serve as guide plates or stabilizing plates.

The present invention has been explained in detail referring to the accompanying drawings. However, the present invention is not limited to those expalined and it may be modified or changed by those skilled in the art within the spirit and scope thereof defined in the appended claims.

What is claimed is:

1. A solids-liquid separator for use in a sewerage system also including an upstream combined sewer and a downstream sewage treatment plant for treating sewerage comprising:
   a basin having a side wall and a bottom;
   an inlet port in said side wall of said basin for introducing solids-liquid into the basin so as to cause a swirling flow of solids-liquid within said basin;
   foul discharge means for discharging solids settled from the liquid from the center portion of the bottom of said basin;
   means for preventing incoming sewerage from exceeding processing capacity of said plant including means for defining an outflow opening in said side wall between upper and lower edges thereof for discharging treated liquid outside said system, said outflow opening being disposed in said basin wall remote from and downstream of said inlet port with respect to the direction of flow of said swirling flow so that separation between said inlet port and said outflow opening measured circumferentially with respect to said swirling flow subtends at least 180° about the center of said basin; and
   overflow means for directing an overflow portion of the liquid with floatable solids to said plant including means for defining an overflow opening in said basin bottom at the center of said basin which opening is defined by an overflow edge higher than said upper edge of said outflow opening so that the surface of said swirling flow flows outwardly from the center of said basin.

2. A solids-liquid separator as in claim 1, wherein said foul discharge means comprises a foul discharge pipe provided in the bottom of said basin.

3. A solids-liquid separator as in claim 1, wherein said overflow means comprises a vertical pipe disposed in said basin, said pipe passing through said wall to the outside of said basin.

4. A solids-liquid separator as in claim 3, wherein the height of said vertical pipe is adjustable.

5. A solids-liquid separator as in claim 1, further including a guide plate disposed within the basin adjacent to said inlet port so as to control the direction of flow of said solids-liquid entering said basin.

6. A solids-liquid separator as in claim 1, wherein said preventing means further includes an outflow passage coupled with said outflow opening, said outflow passage including therein weir means for controlling the vertical height of the liquid in the basin.

7. A solids-liquid separator as in claim 6, wherein an upper edge of said weir means is higher than said upper edge of said outflow opening.

8. A solids-liquid separator as claimed in claim 6, wherein
   said weir means is adjustable to regulate the amount of liquid flowing over said weir.

9. A sewerage system for handling sewerage composed of solids and liquid, comprising:
   a combined sewer collection means for collecting run-off rain water and said sewerage to form solids-liquid;
   a sewage treatment plant located downstream of said combined sewer collection means; and
   a solids-liquid separator means, upstream of said plant and downstream of said collection means, for receiving solids-liquid therefrom, and for treating said solids-liquid, said separator means further comprising
   a basin having a side wall and a bottom,
   an inlet port in said side wall of said basin for introducing said solids-liquid from said collection means into the basin causing a swirling flow of said solids-liquid within said basin,
   foul discharge means for discharging to said plant settled solids from a center portion of the bottom of said basin,
   means for preventing sewerage entering said plant from exceeding processing capacity of said plant including means for defining an outflow opening in said side wall between upper and lower edges for removing treated liquid from said system, said outflow opening being disposed in said basin wall remote from and downstream of said inlet port with respect to the direction of flow of said swirling flow so that separation between said inlet port and said outflow opening measured circumferentially with respect to said swirling flow subtends at least 180° about the center of said basin, and
   overflow means for directing an overflow portion of said sewerage with floatable solids to said plant including means for defining an overflow opening in the center of said basin bottom which opening is defined by an overflow edge higher than said upper edge of said outflow opening so that the surface of said swirling flow flows outwardly from the center of said basin.

10. A sewerage system as in claim 9, wherein said foul discharge means comprises a foul discharge pipe provided in the bottom of said basin.

11. A sewerage system as in claim 9, wherein said overflow means comprises a vertical pipe disposed in said basin, said pipe passing through said wall to the outside of said basin.

12. A sewerage system as in claim 11, wherein the height of said vertical pipe is adjustable.

13. A sewerage system as in claim 9, further including a guide plate disposed within the basin adjacent to said inlet port so as to control the direction of flow of said solids-liquid entering said basin.

14. A sewerage system as in claim 9, wherein said preventing means further includes an outflow passage coupled with said outflow opening, said outflow passage including therein weir means for controlling the vertical height of the liquid in the basin.

15. A sewerage system as in claim 14, wherein an upper edge of said weir means is higher than said upper edge of said outflow opening.

16. A sewerage system as claimed in claim 14, wherein
   said weir means is adjustable to regulate the amount of liquid flowing over said weir.

* * * * *